United States Patent
Tsuda et al.

(10) Patent No.: US 12,355,473 B2
(45) Date of Patent: Jul. 8, 2025

(54) RADIO-FREQUENCY MODULE AND COMMUNICATION DEVICE

(71) Applicant: Murata Manufacturing Co., Ltd., Kyoto (JP)

(72) Inventors: Motoji Tsuda, Kyoto (JP); Yukiya Yamaguchi, Kyoto (JP); Takanori Uejima, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 370 days.

(21) Appl. No.: 18/183,297

(22) Filed: Mar. 14, 2023

(65) Prior Publication Data

US 2023/0223968 A1     Jul. 13, 2023

Related U.S. Application Data

(63) Continuation of application No. PCT/JP2021/041623, filed on Nov. 11, 2021.

(30) Foreign Application Priority Data

Nov. 25, 2020 (JP) .................... 2020-195438

(51) Int. Cl.
*H04B 1/00* (2006.01)
*H04B 1/04* (2006.01)

(52) U.S. Cl.
CPC ......... *H04B 1/0078* (2013.01); *H04B 1/0458* (2013.01); *H04B 2001/0408* (2013.01)

(58) Field of Classification Search
CPC ............. H04B 1/38; H04B 2001/0408; H04B 1/0458; H04B 1/0078; H04B 1/18; H04B 1/00; H03H 7/38; H05K 1/18
See application file for complete search history.

(56) References Cited

U.S. PATENT DOCUMENTS

| 10,389,310 B2 * | 8/2019 | Nakajima et al. ........ H03F 1/12 |
| 10,546,852 B2 | 1/2020 | Dutta et al. |

(Continued)

FOREIGN PATENT DOCUMENTS

| JP | 2020-102693 A | 7/2020 |
| WO | 2018/123699 A1 | 7/2018 |

(Continued)

OTHER PUBLICATIONS

International Search Report for PCT/JP2021/041623 dated Feb. 15, 2022.

*Primary Examiner* — Curtis A Kuntz
(74) *Attorney, Agent, or Firm* — McDonald Hopkins LLC

(57) ABSTRACT

A radio-frequency module includes a first base, which has at least a part formed of a first semiconductor material and which includes a low-noise amplifier circuit, a second base, which has at least a part formed of a second semiconductor material having a thermal conductivity lower than that of the first semiconductor material and which includes a power amplifier circuit, and a module substrate, which has a principal surface on which the first base and the second base are disposed. The first base is joined to the principal surface with electrodes interposed in between. The second base is disposed between the module substrate and the first base in cross-sectional view, and is joined to the principal surface with an electrode interposed in between. At least a part of the first base overlaps at least a part of the second base in plan view.

20 Claims, 8 Drawing Sheets

(56) References Cited

U.S. PATENT DOCUMENTS

| | | | | |
|---|---|---|---|---|
| 12,040,824 B2* | 7/2024 | Oshita | ............... | H04B 1/04 |
| 2017/0117857 A1* | 4/2017 | McPartlin | ............ | H03F 3/24 |
| 2019/0320531 A1 | 10/2019 | Yasuda | | |
| 2020/0203291 A1 | 6/2020 | Uejima | | |
| 2020/0212951 A1 | 7/2020 | Hanaoka | | |
| 2021/0152202 A1 | 5/2021 | Uejima | | |
| 2021/0399758 A1 | 12/2021 | Yamaguchi | | |

FOREIGN PATENT DOCUMENTS

| | | |
|---|---|---|
| WO | 2019/054154 A1 | 3/2019 |
| WO | 2019/240096 A1 | 12/2019 |
| WO | 2020/179504 A1 | 9/2020 |

\* cited by examiner

RADIO-FREQUENCY MODULE AND COMMUNICATION DEVICE

CROSS REFERENCE TO RELATED APPLICATION

This is a continuation of International Application No. PCT/JP2021/041623 filed on Nov. 11, 2021 which claims priority from Japanese Patent Application No. 2020-195438 filed on Nov. 25, 2020. The contents of these applications are incorporated herein by reference in their entireties.

BACKGROUND OF THE DISCLOSURE

Field of the Disclosure

The present disclosure relates to a radio-frequency module and a communication device.

Description of the Related Art

Mobile communication devices such as a cellular phone have more complicated layout configurations of circuit devices, which are included in radio-frequency front-end circuits, particularly with advances in multiband technology. In the radio-frequency module described in Patent Document 1, a power amplifier is mounted on a first principal surface of a module substrate, and a low-noise amplifier is mounted on a second principal surface which is opposite to the first principal surface of the module substrate, achieving a reduction in size of the radio-frequency module.

Patent Document 1: International Publication No. 2019/240096

BRIEF SUMMARY OF THE DISCLOSURE

However, a further reduction in size of radio-frequency modules has been required.

Accordingly, the present disclosure provides a radio-frequency module and a communication device which achieve a further reduction in size.

A radio-frequency module according to an aspect of the present disclosure includes a first base that has at least a part formed of a first semiconductor material, and that includes a low-noise amplifier circuit, a second base that has at least a part formed of a second semiconductor material having a thermal conductivity lower than the thermal conductivity of the first semiconductor material, and that includes a power amplifier circuit, and a module substrate that has a principal surface on which the first base and the second base are disposed. The first base is joined to the principal surface with a first electrode interposed in between. The second base is disposed between the module substrate and the first base in cross-sectional view, and is joined to the principal surface with a second electrode interposed in between. At least a part of the first base overlaps at least a part of the second base in plan view.

A radio-frequency module according to an aspect of the present disclosure includes a first base that has at least a part formed of silicon or gallium nitride, and that includes a low-noise amplifier circuit, a second base that has at least a part formed of gallium arsenide or silicon germanium, and that includes a power amplifier circuit, and a module substrate that has a principal surface on which the first base and the second base are disposed. The first base is joined to the principal surface with a first electrode interposed in between. The second base is disposed between the module substrate and the first base in cross-sectional view, and is joined to the principal surface with a second electrode interposed in between. At least a part of the first base overlaps at least a part of the second base in plan view.

The radio-frequency modules according to the aspects of the present disclosure achieve a further reduction in size.

DETAILED DESCRIPTION OF THE DISCLOSURE

Figure 1:
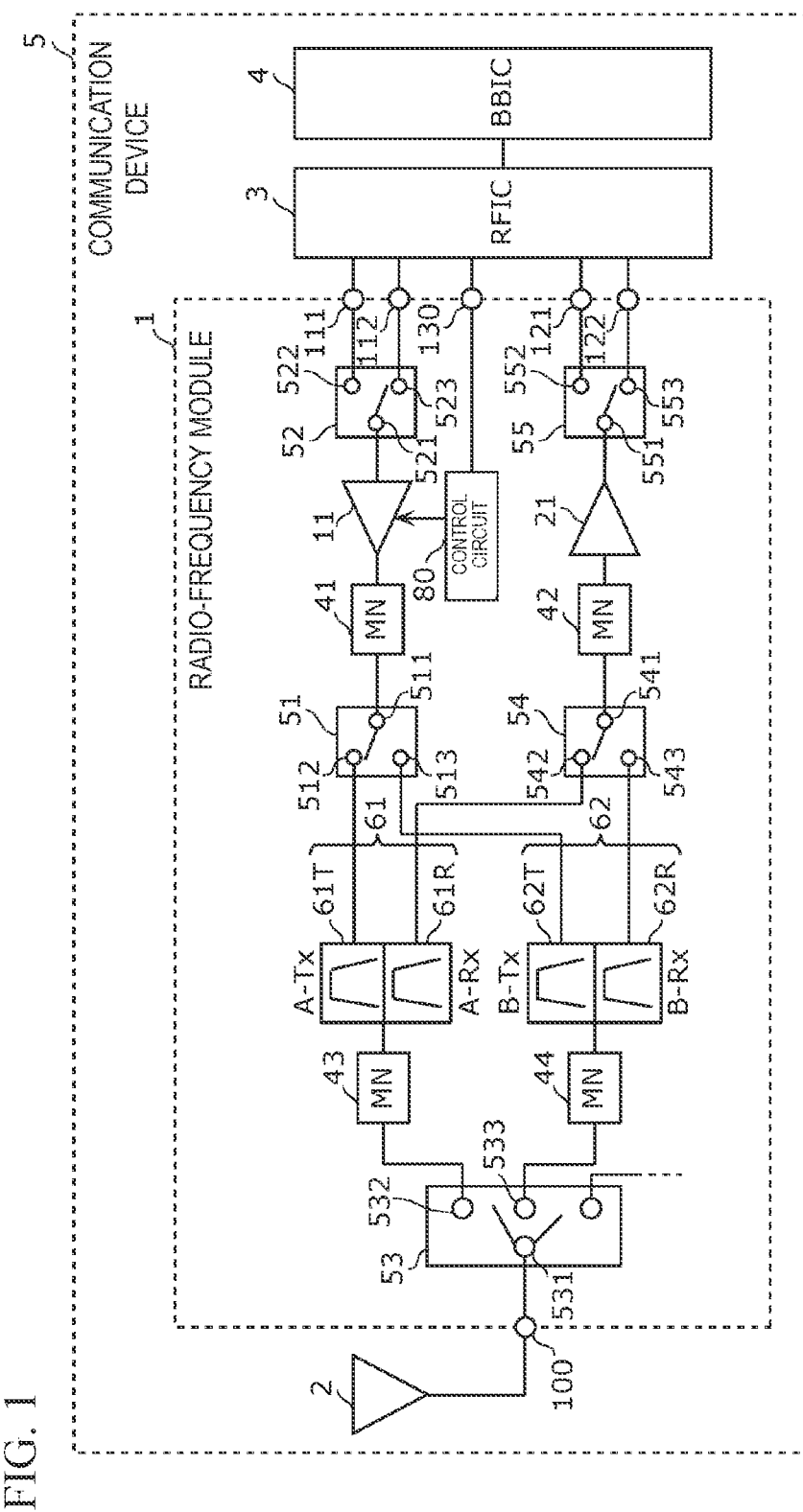
FIG. 1 is a diagram illustrating the circuit configuration of a radio-frequency module and a communication device according to a first embodiment.

Embodiments of the present disclosure will be described below in detail by using the drawings. The embodiments described below are comprehensive and concrete examples. The numeral values, the shapes, the materials, the components, the layout and the connection form of components, and the like described in the embodiments described below are exemplary, and are not intended to limit the present disclosure.

The figures are schematic views with appropriate emphasis, abbreviation, or adjustment of ratios for illustration of the present disclosure, and are not necessarily illustrated strictly. The shapes, the positional relationship, and the ratios may be different from the actual ones. In the figures, substantially the same configurations are designated with the same reference numerals. Repeated description may be skipped or simplified.

In the figures described below, x axis and y axis are orthogonal to each other in a plane parallel to a principal surface of a module substrate. Specifically, when a module substrate is rectangular in plan view, x axis is parallel to a first side of the module substrate; y axis is parallel to a second side orthogonal to the first side of the module substrate. In addition, z axis is perpendicular to the principal surface of the module substrate. The positive direction of z axis indicates the upward direction; its negative direction indicates the downward direction.

In a circuit configuration in the present disclosure, "to connect" encompasses, not only the case of the direct connection using a connection terminal and/or a wiring conductor, but also the case of electrical connection via other circuit devices. "To be connected between A and B" means the connection, between A and B, to both A and B.

In a component layout in the present disclosure, "in plan view" means viewing an object subjected to orthogonal projection to xy plane from the z-axis positive side. "In plan view, A overlaps B" means that the area of A subjected to orthogonal projection to xy plane overlaps the area of B subjected to orthogonal projection to xy plane. "In plan view, A is disposed between B and C" means that at least one of line segments connecting any points in the area of B, which is projected to xy plane, to any points in the area of C, which is projected to xy plane, passes through the area of A, which is projected to xy plane. "In cross-sectional view" means viewing a cross section which is perpendicular to xy plane and which is obtained through cutting. "In cross-sectional view, A is disposed between B and C" means that, in a cross section perpendicular to xy plane, at least one of line segments connecting any points in the area of B to any points in the area of C passes through the area of A. Terms indicating the relationships between components, such as "parallel" and "perpendicular", terms indicating the shapes of components, such as "rectangular", and numeral ranges are not intended to have only strict meaning, and mean substantially equivalent ranges, for example, having errors in the order of a few percent.

"To dispose a component on/in a substrate" encompasses, in addition to the placement of a component on a substrate in the state in which the component is in contact with the substrate, the placement of a component above a substrate in the state in which the component is not in contact with the substrate (for example, the component is laminated on another component disposed on the substrate), and the placement of a component in the state in which a part or the entirety of the component is embedded in the substrate. "To dispose a component on a principal surface of a substrate" encompasses, in addition to the placement of a component on a principal surface in the state in which the component is in contact with the principal surface of a substrate, the placement of a component above a principal surface in the state in which the component is not in contact with the principal surface, and the placement of a component in the state in which a part of the component is embedded in a substrate from the principal surface side.

First Embodiment

[1.1 the Circuit Configuration of a Radio-Frequency Module 1 and a Communication Device 5]

The circuit configuration, according to the present embodiment, of a radio-frequency module 1 and a communication device 5, which includes the radio-frequency module 1, will be described by referring to FIG. 1. FIG. 1 is a diagram illustrating the circuit configuration of the radio-frequency module 1 and the communication device 5 according to a first embodiment.

[1.1.1 the Circuit Configuration of the Communication Device 5]

As illustrated in FIG. 1, the communication device 5 according to the present embodiment includes the radio-frequency module 1, an antenna 2, an RFIC (Radio Frequency Integrated Circuit) 3, and a BBIC (Baseband Integrated Circuit) 4.

The radio-frequency module 1 transmits radio-frequency signals between the antenna 2 and the RFIC 3. The internal configuration of the radio-frequency module 1 will be described below.

The antenna 2, which is connected to an antenna connection terminal 100 of the radio-frequency module 1, receives radio-frequency signals from the outside, and outputs the radio-frequency signals to the radio-frequency module 1.

The RFIC 3 is an exemplary signal processing circuit which processes radio-frequency signals. Specifically, the RFIC 3 performs signal processing such as down-converting on radio-frequency receive signals received through the receive paths of the radio-frequency module 1, and outputs, to the BBIC 4, the receive signals generated through the signal processing. In addition, the RFIC 3 has a controller which controls, for example, switching circuits and amplifier circuits which are included in the radio-frequency module 1. Some or all of the functions, as a controller, of the RFIC 3 may be included in a component which is present outside the RFIC 3, or may be included, for example, in the BBIC 4 or the radio-frequency module 1.

The BBIC 4 is a baseband signal processing circuit which performs signal processing using an intermediate frequency band whose frequency is lower than that of radio-frequency signals transmitted by the radio-frequency module 1. Signals processed by the BBIC 4 are, for example, image signals for image display and/or voice signals for calls through a speaker.

In the communication device 5 according to the present embodiment, the antenna 2 and the BBIC 4 are not necessary components.

[1.1.2 the Circuit Configuration of the Radio-Frequency Module 1]

The circuit configuration of the radio-frequency module 1 will be described. As illustrated in FIG. 1, the radio-frequency module 1 includes a power amplifier circuit 11, a low-noise amplifier circuit 21, impedance matching circuits (MNs) 41 to 44, switching circuits 51 to 55, duplexer circuits 61 and 62, a control circuit 80, the antenna connection terminal 100, radio-frequency input terminals 111 and 112, radio-frequency output terminals 121 and 122, and a control terminal 130.

The antenna connection terminal 100 is connected, outside the radio-frequency module 1, to the antenna 2.

Each of the radio-frequency input terminals 111 and 112 is an input terminal for receiving radio-frequency transmit signals from the outside of the radio-frequency module 1. In the present embodiment, the radio-frequency input terminals 111 and 112 are connected, outside the radio-frequency module 1, to the RFIC 3.

Each of the radio-frequency output terminals 121 and 122 is an output terminal for providing radio-frequency receive signals to the outside of the radio-frequency module 1. In the present embodiment, the radio-frequency output terminals 121 and 122 are connected, outside the radio-frequency module 1, to the RFIC 3.

The control terminal 130 is a terminal for transmitting a control signal. That is, the control terminal 130 is a terminal for receiving a control signal from the outside of the radio-frequency module 1, and/or a terminal for supplying a control signal to the outside of the radio-frequency module 1. The control signal is related to the control of an electronic component included in the radio-frequency module 1. Specifically, the control signal is a digital signal for controlling, for example, the power amplifier circuit 11, the switching circuits 51 to 54, or the low-noise amplifier circuit 21.

The power amplifier circuit 11, which is an exemplary amplifier circuit, is capable of amplifying transmit signals in Band A and Band B. The power amplifier circuit 11 is connected, at its input end, to the radio-frequency input terminals 111 and 112 through the switching circuit 52. The power amplifier circuit 11 is connected, at its output end, to transmit-filter circuits 61T and 62T through the impedance matching circuit 41 and the switching circuit 51. The configuration of the power amplifier circuit 11 is not particularly limited to this. For example, the power amplifier circuit 11 may be a multistage amplifier circuit, or may be a differential amplifier circuit.

The low-noise amplifier circuit 21 is capable of amplifying receive signals in Band A and Band B. The low-noise amplifier circuit 21 is connected, at its input end, to receive-filter circuits 61R and 62R through the impedance matching circuit 42 and the switching circuit 54. The low-noise amplifier circuit 21 is connected, at its output end, to the radio-frequency output terminals 121 and 122 through the switching circuit 55.

The impedance matching circuit 41 is connected to the output end of the power amplifier circuit 11, and is connected to the input ends of the transmit-filter circuits 61T and 62T through the switching circuit 51. The impedance matching circuit 41 is capable of achieving impedance matching between the output impedance of the power amplifier circuit 11 and the input impedance of the switching circuit 51.

The impedance matching circuit 42 is connected to the input end of the low-noise amplifier circuit 21, and is connected to the output ends of the receive-filter circuits 61R and 62R through the switching circuit 54. The impedance matching circuit 42 is capable of achieving impedance matching between the output impedance of the switching circuit 54 and the input impedance of the low-noise amplifier circuit 21.

The impedance matching circuit 43 is connected to the output end of the transmit-filter circuit 61T and the input end of the receive-filter circuit 61R, and is connected to the antenna connection terminal 100 through the switching circuit 53. The impedance matching circuit 43 is capable of achieving impedance matching between the switching circuit 53 and the duplexer circuit 61.

The impedance matching circuit 44 is connected to the output end of the transmit-filter circuit 62T and the input end of the receive-filter circuit 62R, and is connected to the antenna connection terminal 100 through the switching circuit 53. The impedance matching circuit 44 is capable of achieving impedance matching between the switching circuit 53 and the duplexer circuit 62.

The switching circuit 51, which is an exemplary first switching circuit, is connected between the output end of the power amplifier circuit 11 and the input ends of the transmit-filter circuits 61T and 62T. The switching circuit 51 has terminals 511 to 513. The terminal 511 is connected to the output end of the power amplifier circuit 11 through the impedance matching circuit 41. The terminal 512 is connected to the input end of the transmit-filter circuit 61T. The terminal 513 is connected to the input end of the transmit-filter circuit 62T.

In this connection configuration, the switching circuit 51 is capable of connecting the terminal 511 to any of the terminals 512 and 513, for example, on the basis of a control signal from the RFIC 3. That is, the switching circuit 51 is capable of switching the connection to the output end of the power amplifier circuit 11 between the transmit-filter circuits 61T and 62T. The switching circuit 51 is formed, for example, by using an SPDT (Single-Pole Double-Throw) switch, and may be called a band select switch.

The switching circuit 52, which is an exemplary second switching circuit, is connected between the radio-frequency input terminals 111 and 112 and the input end of the power amplifier circuit 11. The switching circuit 52 has terminals 521 to 523. The terminal 521 is connected to the input end of the power amplifier circuit 11. The terminals 522 and 523 are connected to the radio-frequency input terminals 111 and 112, respectively.

In this connection configuration, the switching circuit 52 is capable of connecting the terminal 521 to any of the terminals 522 and 523, for example, on the basis of a control signal from the RFIC 3. That is, the switching circuit 52 is capable of switching the connection to the input end of the power amplifier circuit 11 between the radio-frequency input terminals 111 and 112. The switching circuit 52 is formed, for example, by using an SPDT switch, and may be called an in-switch.

The switching circuit 53, which is an exemplary third switching circuit, is connected between the antenna connection terminal 100 and the duplexer circuits 61 and 62. The switching circuit 53 has terminals 531 to 533. The terminal 531 is connected to the antenna connection terminal 100. The terminal 532 is connected to the output end of the transmit-filter circuit 61T and the input end of the receive-filter circuit 61R through the impedance matching circuit 43. The terminal 533 is connected to the output end of the transmit-filter circuit 62T and the input end of the receive-filter circuit 62R through the impedance matching circuit 44.

In this connection configuration, the switching circuit 53 is capable of connecting the terminal 531 to one or both of the terminals 532 and 533, for example, on the basis of a control signal from the RFIC 3. That is, the switching circuit 53 is capable of switching between the connection and the disconnection between the antenna connection terminal 100 and the duplexer circuit 61, and is capable of switching between the connection and the disconnection between the antenna connection terminal 100 and the duplexer circuit 62. The switching circuit 53 is formed, for example, by using a multi-connection switch, and may be called an antenna switch.

The switching circuit 54 is connected between the input end of the low-noise amplifier circuit 21 and the output ends of the receive-filter circuits 61R and 62R. The switching circuit 54 has terminals 541 to 543. The terminal 541 is connected to the input end of the low-noise amplifier circuit 21 through the impedance matching circuit 42. The terminal 542 is connected to the output end of the receive-filter circuit 61R. The terminal 543 is connected to the output end of the receive-filter circuit 62R.

In this connection configuration, the switching circuit 54 is capable of connecting the terminal 541 to any of the terminals 542 and 543, for example, on the basis of a control signal from the RFIC 3. That is, the switching circuit 54 is capable of switching the connection to the input end of the low-noise amplifier circuit 21 between the receive-filter circuits 61R and 62R. The switching circuit 54 is formed, for example, by using an SPDT switch.

The switching circuit 55 is connected between the radio-frequency output terminals 121 and 122 and the output end of the low-noise amplifier circuit 21. The switching circuit 55 has terminals 551 to 553. The terminal 551 is connected to the output end of the low-noise amplifier circuit 21. The terminals 552 and 553 are connected to the radio-frequency output terminals 121 and 122, respectively.

In this connection configuration, the switching circuit 55 is capable of connecting the terminal 551 to any of the terminals 552 and 553, for example, on the basis of a control signal from the RFIC 3. That is, the switching circuit 55 is capable of switching the connection to the output end of the low-noise amplifier circuit 21 between the radio-frequency output terminals 121 and 122. The switching circuit 55 is formed, for example, by using an SPDT switch, and may be called an out-switch.

The duplexer circuit 61 is capable of passing radio-frequency signals in Band A. The duplexer circuit 61 transmits transmit signals and receive signals in Band A by using an FDD (Frequency Division Duplex) system. The duplexer circuit 61 includes the transmit-filter circuit 61T and the receive-filter circuit 61R.

The transmit-filter circuit 61T (A-Tx) has a passband including the uplink operating band of Band A. Thus, the transmit-filter circuit 61T is capable of passing transmit signals in Band A. The transmit-filter circuit 61T is connected between the power amplifier circuit 11 and the antenna connection terminal 100. Specifically, the transmit-filter circuit 61T is connected, at its input end, to the output end of the power amplifier circuit 11 through the switching circuit 51 and the impedance matching circuit 41. In contrast, the transmit-filter circuit 61T is connected, at its output end, to the antenna connection terminal 100 through the impedance matching circuit 43 and the switching circuit 53.

The receive-filter circuit 61R (A-Rx) has a passband including the downlink operating band of Band A. Thus, the receive-filter circuit 61R is capable of passing receive signals in Band A. The receive-filter circuit 61R is connected between the antenna connection terminal 100 and the low-noise amplifier circuit 21. Specifically, the receive-filter circuit 61R is connected, at its input end, to the antenna connection terminal 100 through the impedance matching circuit 43 and the switching circuit 53. In contrast, the receive-filter circuit 61R is connected, at its output end, to the low-noise amplifier circuit 21 through the switching circuit 54 and the impedance matching circuit 42.

The duplexer circuit 62 is capable of passing radio-frequency signals in Band B. The duplexer circuit 62 transmits transmit signals and receive signals in Band B by using an FDD system. The duplexer circuit 62 includes the transmit-filter circuit 62T and the receive-filter circuit 62R.

The transmit-filter circuit 62T (B-Tx) has a passband including the uplink operating band of Band B. Thus, the transmit-filter circuit 62T is capable of passing transmit signals in Band B. The transmit-filter circuit 62T is connected between the power amplifier circuit 11 and the antenna connection terminal 100. Specifically, the transmit-filter circuit 62T is connected, at its input end, to the output end of the power amplifier circuit 11 through the switching circuit 51 and the impedance matching circuit 41. In contrast, the transmit-filter circuit 62T is connected, at its output end, to the antenna connection terminal 100 through the impedance matching circuit 44 and the switching circuit 53.

The receive-filter circuit 62R (B-Rx) has a passband including the downlink operating band of Band B. Thus, the receive-filter circuit 62R is capable of passing receive signals in Band B. The receive-filter circuit 62R is connected between the antenna connection terminal 100 and the low-noise amplifier circuit 21. Specifically, the receive-filter circuit 62R is connected, at its input end, to the antenna connection terminal 100 through the impedance matching circuit 44 and the switching circuit 53. In contrast, the receive-filter circuit 62R is connected, at its output end, to the low-noise amplifier circuit 21 through the switching circuit 54 and the impedance matching circuit 42.

The control circuit 80 is a power amplifier controller which controls the power amplifier circuit 11. The control circuit 80 receives a control signal from the RFIC 3 through the control terminal 130, and outputs a control signal to the power amplifier circuit 11.

One or more circuits among the circuits illustrated in FIG. 1 are not necessarily included in the radio-frequency module 1. For example, the radio-frequency module 1 may have any configuration as long as the radio-frequency module 1 includes at least the power amplifier circuit 11 and the low-noise amplifier circuit 21, and the other circuits are not necessarily included in the radio-frequency module 1.

[1.2 the Component Layout of the Radio-Frequency Module 1]

An exemplary component layout of the radio-frequency module 1 having the configuration described above will be described specifically by referring to FIGS. 2 and 3.

Figure 2:
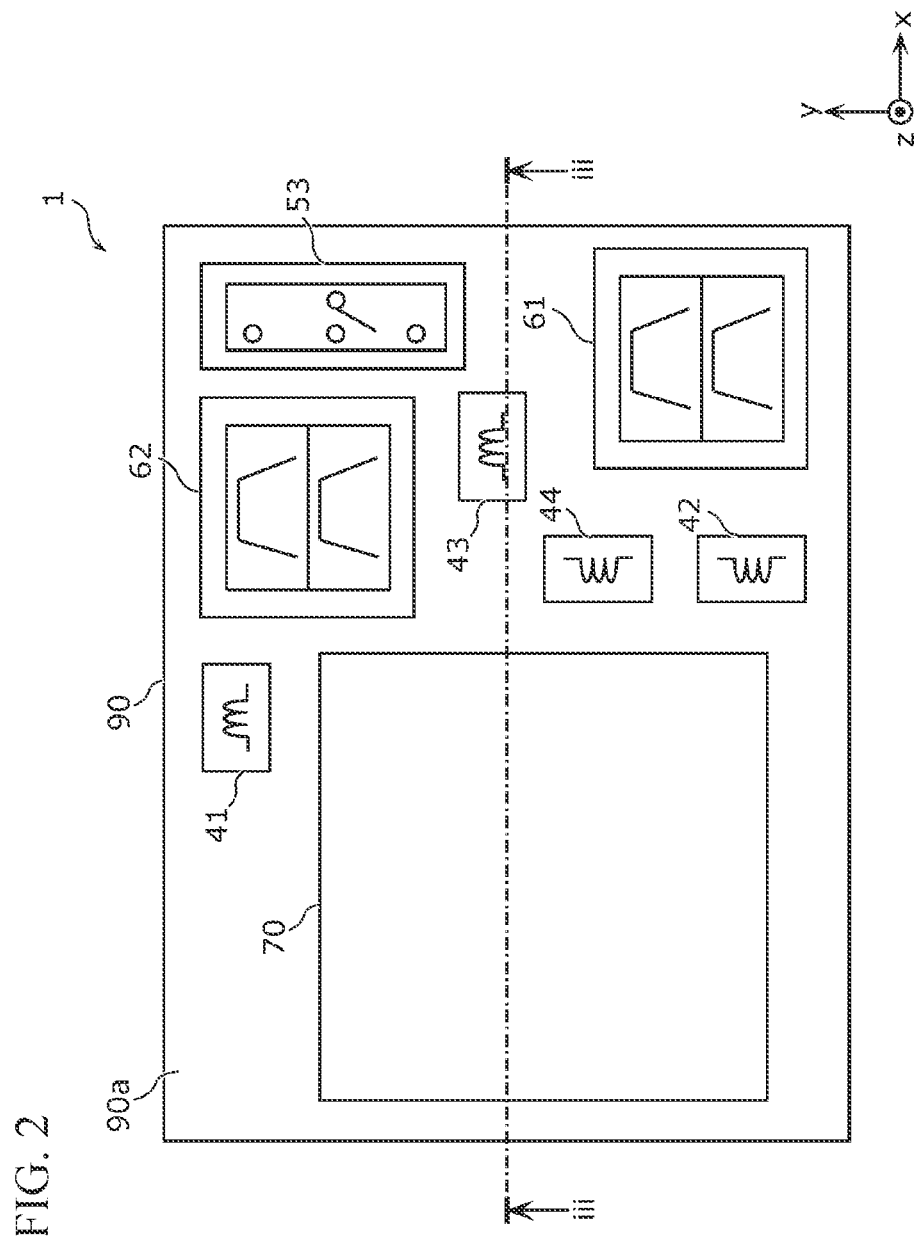
FIG. 2 is a plan view of a radio-frequency module according to the first embodiment.

FIG. 2 is a plan view of the radio-frequency module 1 according to the first embodiment. FIG. 3 is a cross-sectional view of the radio-frequency module 1 according to the first embodiment. The cross section of the radio-frequency module 1 in FIG. 3 corresponds to the cross section along line iii-iii in FIG. 2.

In addition to the components included in the circuit illustrated in FIG. 1, the radio-frequency module 1 further includes a module substrate 90, a resin member 91, a shield electrode layer 92, and multiple external connection terminals 150. In FIG. 2, the resin member 91 and the shield electrode layer 92 are not illustrated. In FIGS. 2 and 3, wiring connecting, to each other, components disposed on the module substrate 90 is not illustrated.

The module substrate 90 has principal surfaces 90a and 90b which are opposite to each other. In the present embodiment, the module substrate 90 is rectangular in plan view, but the shape of the module substrate 90 is not limited to this. The module substrate 90 may be, for example, an LTCC (Low Temperature Co-fired Ceramics) substrate or an HTCC (High Temperature Co-fired Ceramics) substrate, which has a layered structure of multiple dielectric layers, a component-embedded substrate, a substrate having an RDL (Redistribution Layer), or a printed board. However, the module substrate 90 is not limited to these.

An integrated circuit 70, the impedance matching circuits 41 to 44, the switching circuit 53, and the duplexer circuits 61 and 62 are disposed on the principal surface 90a. The principal surface 90a and the components on the principal surface 90a are covered by the resin member 91.

The integrated circuit 70 includes a first base 71 and a second base 72. The second base 72 and the first base 71 are laminated in this sequence on the principal surface 90a of the module substrate 90. The details of the integrated circuit 70 will be described below by using FIGS. 4 to 6.

Each of the impedance matching circuits 41 to 44 includes an inductor. Each of the impedance matching circuits 41 to 44 may include a capacitor instead of an inductor, or may include both an inductor and a capacitor. Each of the inductors included in the impedance matching circuits 41 to 44 is formed by using an SMD (Surface Mount Device). Some or all of the inductors included in the impedance matching circuits 41 to 44 may be formed by using IPDs (Integrated Passive Devices).

The switching circuit 53 is formed, for example, by using multiple MOSFETs (Metal-Oxide-Semiconductor Field-Effect Transistors) which are connected to each other in series. The number of stages in series connection of the MOSFETs may be any as long as the number is determined in accordance with a required withstand voltage, and has no particular limitation.

Each of the duplexer circuits 61 and 62 may be formed, for example, by using any of a SAW (Surface Acoustic Wave) filter, a BAW (Bulk Acoustic Wave) filter, an LC resonant filter, and a dielectric filter. Further, the configuration is not limited to these.

The resin member 91 covers the principal surface 90a and the components on the principal surface 90a. The resin member 91 has a function of ensuring reliability of mechanical strength, moisture resistance, and the like of the components on the principal surface 90a. The resin member 91 is not a necessary component.

The shield electrode layer 92, which is, for example, a thin metal film formed by using a sputtering method, is formed so as to cover the top surface and the side surfaces of the resin member 91 and the side surfaces of the module substrate 90. The shield electrode layer 92 is set to the ground potential, and suppresses the invasion of external noise into the components included in the radio-frequency module 1.

The external connection terminals 150 are disposed on the principal surface 90b. The external connection terminals 150 include the antenna connection terminal 100, the radio-frequency input terminals 111 and 112, the radio-frequency output terminals 121 and 122, and the control terminal 130 which are illustrated in FIG. 1, as well as ground terminals. Each of the external connection terminals 150 is joined, for example, to an input/output terminal and/or a ground terminal on a mother board disposed in the z-axis negative direction of the radio-frequency module 1. The external connection terminals 150 may be, for example, bump electrodes, but the configuration is not limited to this.

Figure 3:
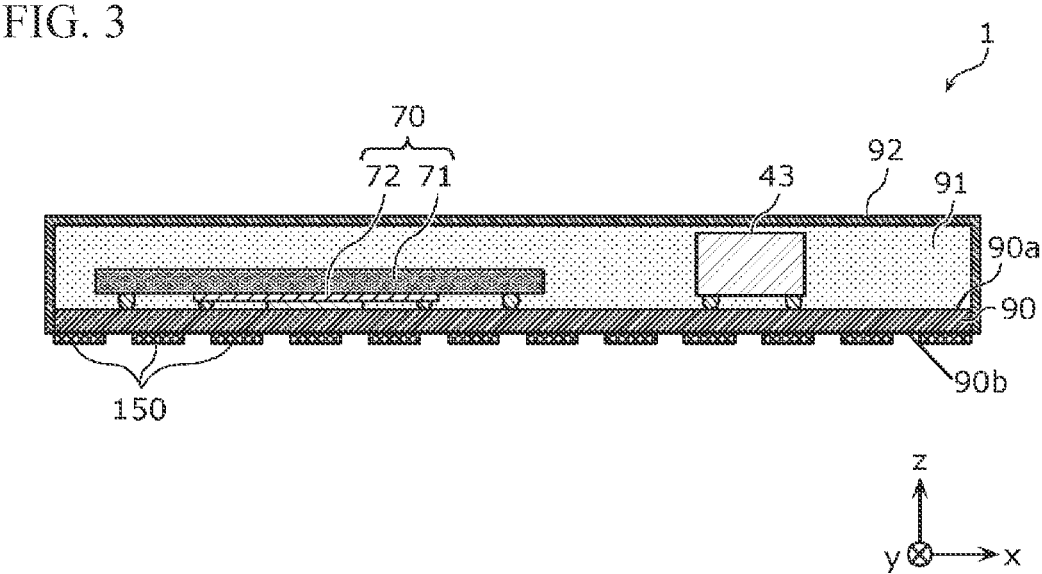
FIG. 3 is a cross-sectional view of a radio-frequency module according to the first embodiment.

The component layout illustrated in FIGS. 2 and 3 is exemplary, and the layout is not limited to this. For example, some or all of the components may be disposed on the principal surface 90b of the module substrate 90. In this case, the principal surface 90b and the components on the principal surface 90b may be covered by a resin member.

[1.3 the Configuration of the Integrated Circuit 70]

Figure 4:
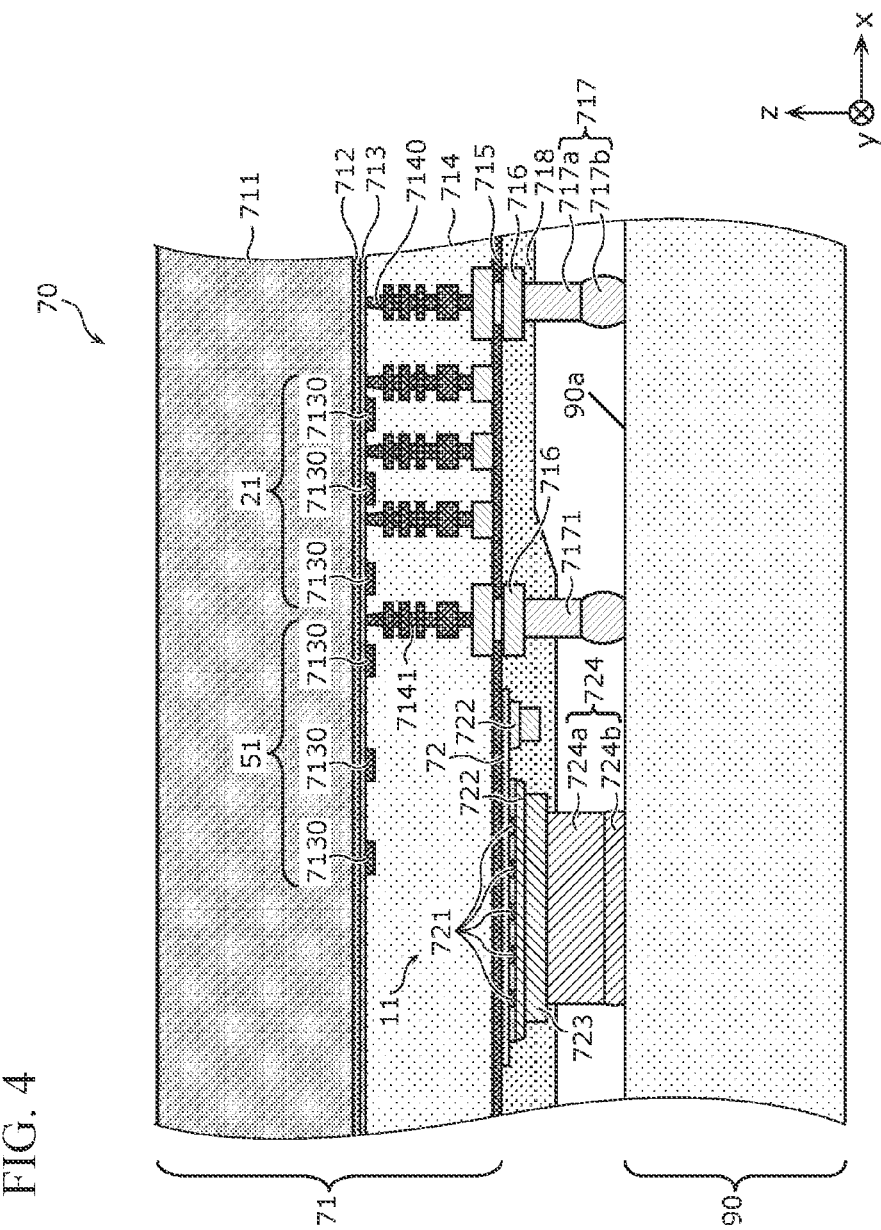
FIG. 4 is a partial cross-sectional view of a radio-frequency module according to the first embodiment.
Figure 5:
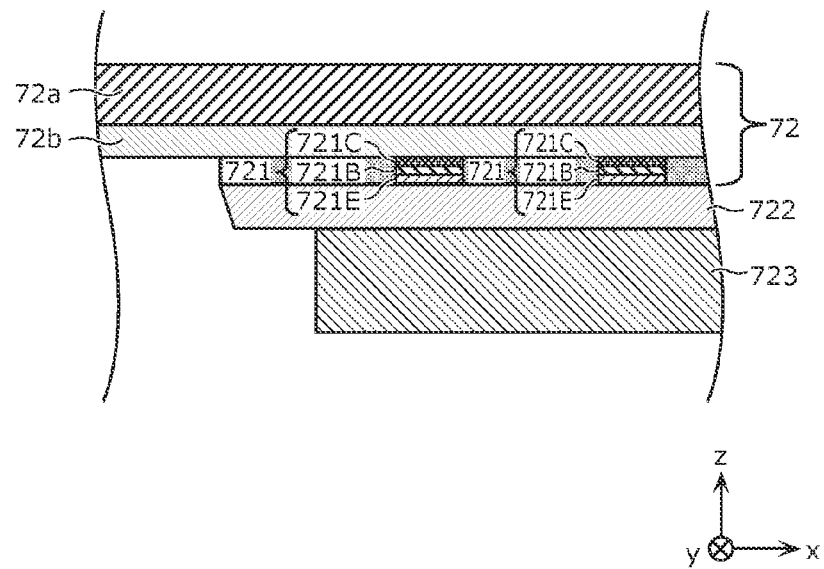
FIG. 5 is a partial cross-sectional view of a radio-frequency module according to the first embodiment.
Figure 6:
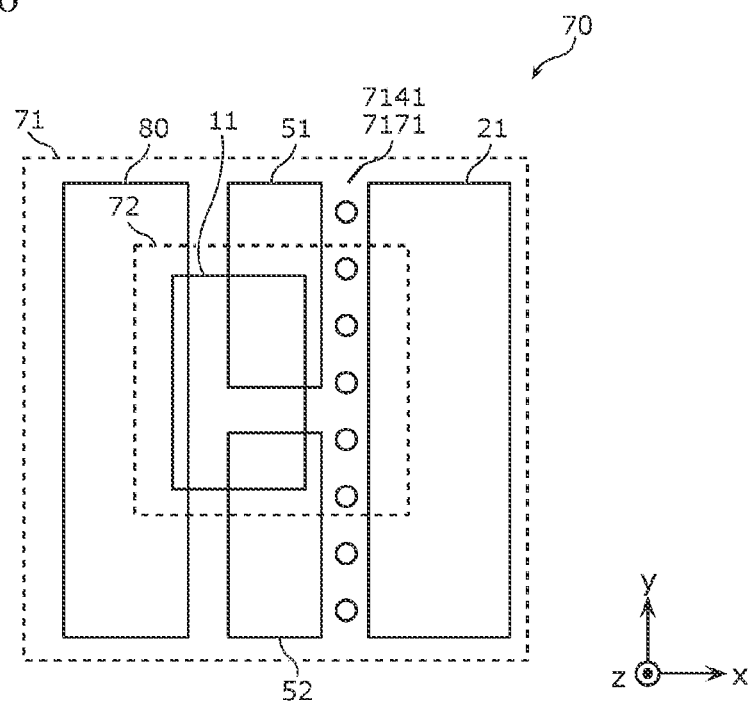
FIG. 6 is a diagram illustrating the circuit layout in an integrated circuit according to the first embodiment.

The configuration of the integrated circuit 70 will be described by referring to FIGS. 4 to 6. FIGS. 4 and 5 are partial cross-sectional views of the radio-frequency module 1 according to the first embodiment. FIG. 6 is a diagram illustrating the circuit layout in the integrated circuit 70 according to the first embodiment. Specifically, FIG. 4 is an enlarged cross-sectional view of the integrated circuit 70. FIG. 5 is an enlarged cross-sectional view of the second base 72. FIG. 6 is a perspective plan view of the integrated circuit 70. In FIGS. 4 to 6, not all the wiring and electrodes are illustrated. In FIG. 6, the broken lines indicate the outlines of the first base 71 and the second base 72.

As illustrated in FIG. 4, the integrated circuit 70 includes the first base 71 and the second base 72. At least a part of the first base 71 overlaps at least a part of the second base 72 in plan view.

[1.3.1 the Configuration of the First Base 71]

The first base 71 will be described. At least a part of the first base 71 is formed of a first semiconductor material. In this example, the first semiconductor material is silicon (Si). The first semiconductor material is not limited to silicon. For example, the first semiconductor material may be a material containing any of gallium arsenide, aluminum arsenide (AlAs), indium arsenide (InAs), indium phosphide (InP), gallium phosphide (GaP), indium antimonide (InSb), gallium nitride, indium nitride (InN), aluminum nitride (AlN), silicon, germanium (Ge), silicon carbide (SiC), and gallium oxide (III) ($Ga_2O_3$), or a multicomponent mixed-crystal material composed of more than one of these materials. However, the first semiconductor material is not limited to these.

The low-noise amplifier circuit 21, the switching circuits 51 and 52, and the control circuit 80 are formed in the first base 71. The electric circuits formed in the first base 71 are not limited to the low-noise amplifier circuit 21, the switching circuits 51 and 52, and the control circuit 80. For example, only either one or some of the low-noise amplifier circuit 21, the switching circuits 51 and 52, and the control circuit 80 may be formed in the first base 71. In addition, a control circuit (not illustrated) which controls the switching circuit 51 and/or the switching circuit 52 may be formed in the first base 71. In addition, at least one of the impedance matching circuits 41 to 44 may be formed in the first base 71.

As illustrated in FIG. 4, the first base 71 includes a silicon substrate 711, a silicon dioxide ($SiO_2$) layer 712, a silicon layer 713, a silicon dioxide layer 714, and a silicon nitride (SiN) layer 715. The silicon dioxide layer 712, the silicon layer 713, the silicon dioxide layer 714, and the silicon nitride layer 715 are laminated on the silicon substrate 711 in this sequence.

The silicon substrate 711 is formed, for example, of a silicon single crystal, and is used as a support substrate.

The silicon dioxide layer 712 is disposed on the silicon substrate 711, and is used as an insulating layer.

The silicon layer 713 is disposed on the silicon dioxide layer 712, and is used as a device layer. In the cross section in FIG. 4, multiple circuit devices 7130 which are included in the low-noise amplifier circuit 21, the switching circuit 51, and the control circuit 80 are formed on the silicon layer 713.

The silicon dioxide layer 714 is disposed on the silicon layer 713, and is used as a wiring forming layer. In the silicon dioxide layer 714, wiring for connecting the control circuit 80 and the switching circuits 51 and 52, which are formed on the silicon layer 713, to electrodes 716, which are formed on a surface of the silicon nitride layer 715, is formed. This wiring includes multiple interconnect layers (not illustrated), and multiple via electrodes 7140 which connect the interconnect layers to each other. The interconnect layers and the via electrodes 7140 are formed, for example, of copper or aluminum.

Via electrodes 7141 included in the via electrodes 7140 are exemplary ground electrodes, and are disposed between the power amplifier circuit 11 and the low-noise amplifier circuit 21 in plan view. The via electrodes 7141 are grounded.

The silicon nitride layer 715 is disposed on the silicon dioxide layer 714, and is used as a passivation layer. The electrodes 716 are formed as a redistribution layer on a part of a surface of the silicon nitride layer 715. The second base 72 is joined to another part of the surface of the silicon nitride layer 715.

The electrodes 716 are joined to electrodes (not illustrated), which are disposed on the module substrate 90, with electrodes 717 interposed in between. The surfaces of the electrodes 716 are coated by a resin layer 718 which is an insulating film.

The electrodes 717 are exemplary first electrodes. Each of the electrodes 717 is an electrode which protrudes from the first base 71 toward the principal surface 90a of the module substrate 90, and is joined, at its leading end, to the principal surface 90a. Each of the electrodes 717 has a columnar conductor 717a and a bump electrode 717b. The bump electrode 717b is joined to an electrode (not illustrated) disposed on the principal surface 90a of the module substrate 90.

The electrodes 717 include protruding electrodes 7171 disposed between the power amplifier circuit 11 and the low-noise amplifier circuit 21 in plan view. The protruding electrodes 7171 are exemplary ground electrodes, and are grounded.

The first base 71 is not limited to the configuration in FIG. 4. For example, the first base 71 does not necessarily include one or some of the layers on the silicon substrate 711.

[1.3.2 The Configuration of the Second Base 72]

The second base 72 will be described. At least a part of the second base 72 is formed of a second semiconductor material having a thermal conductivity lower than that of the first semiconductor material. The second semiconductor material is gallium arsenide. The second semiconductor material is not limited to gallium arsenide. For example, the second semiconductor material may be a material containing any of gallium arsenide, aluminum arsenide, indium arsenide, indium phosphide, gallium phosphide, indium antimonide, gallium nitride, indium nitride, aluminum nitride, silicon germanium, silicon carbide, gallium oxide (III), and gallium bismuth (GaBi), or a multicomponent mixed-crystal material composed of more than one of these materials. The second semiconductor material is not limited to these.

The second base 72 includes the power amplifier circuit 11. Specifically, multiple circuit devices 721, as well as electrodes (not illustrated) for applying voltages to the circuit devices 721 or electrodes (not illustrated) for supplying currents, are formed in the second base 72. The circuit devices 721 form, for example, a heterojunction bipolar transistor (HBT) in which multiple unit transistors are connected to each other in parallel, and are included in the power amplifier circuit 11.

As illustrated in FIG. 5, the second base 72 includes a semiconductor layer 72a, an epitaxial layer 72b formed on a surface of the semiconductor layer 72a, and the circuit devices 721. The semiconductor layer 72a is formed of the second semiconductor material, and is joined to the silicon nitride layer 715 of the first base 71. The semiconductor layer 72a is, for example, a GaAs layer. Each circuit device 721 has a collector layer 721C, a base layer 721B, and an emitter layer 721E. The collector layer 721C, the base layer 721B, and the emitter layer 721E are laminated on the epitaxial layer 72b in this sequence. That is, in each circuit device 721, the collector layer 721C, the base layer 721B, and the emitter layer 721E are laminated in this sequence from the first base 71 side.

For example, the collector layer 721C is formed of n-gallium arsenide. The base layer 721B is formed of p-gallium arsenide. The emitter layer 721E is formed of n-indium gallium phosphorus (InGaP). The emitter layer 721E is joined to an electrode 723 with an electrode 722 which is interposed in between and which is formed on the surface of the second base 72. The electrode 723 is joined to the principal surface 90a of the module substrate 90 with an electrode 724 interposed in between.

The electrode 724, which is an exemplary second electrode, protrudes from the second base 72 toward the principal surface 90a of the module substrate 90, and is joined, at its leading end, to the principal surface 90a. The electrode 724 functions as a thermal-radiation path for the heat generated by the power amplifier circuit 11. The electrode 724 has a columnar conductor 724a and a bump electrode 724b. The bump electrode 724b is joined to an electrode (not illustrated) disposed on the principal surface 90a of the module substrate 90.

The configuration of the second base 72 is not limited to that in FIGS. 4 and 5.

[1.3.3 The Circuit Layout in the Integrated Circuit 70]

The circuit layout in the integrated circuit 70 in plan view will be described by referring to FIG. 6.

As illustrated in FIG. 6, according to the present embodiment, the power amplifier circuit 11 included in the second base 72 does not overlap, in plan view, the low-noise amplifier circuit 21 included in the first base 71. In contrast, a part of the power amplifier circuit 11 overlaps, in plan view, a part of each of the switching circuits 51 and 52 and the control circuit 80 which are formed in the first base 71.

In FIG. 6, the power amplifier circuit 11 overlaps each of the switching circuits 51 and 52 and the control circuit 80 in plan view. However, the layout is not limited to this. For example, the power amplifier circuit 11 may overlap only one or any two of the switching circuits 51 and 52 and the control circuit 80 in plan view.

Further, the impedance matching circuit 41 may be formed in the first base 71. In this case, at least a part of the impedance matching circuit 41 may overlap at least a part of the power amplifier circuit 11 in plan view.

The via electrodes 7141 and the protruding electrodes 7171 overlap each other in plan view, and are disposed between the power amplifier circuit 11 and the low-noise amplifier circuit 21. Specifically, the via electrodes 7141 and the protruding electrodes 7171 are arranged along the boundary of the low-noise amplifier circuit 21 in plan view.

Both the via electrodes 7141 and the protruding electrodes 7171 are not necessarily disposed between the power amplifier circuit 11 and the low-noise amplifier circuit 21 in plan view. For example, only one of the via electrodes 7141 and the protruding electrodes 7171 may be disposed between the power amplifier circuit 11 and the low-noise amplifier circuit 21 in plan view. In this case, the via electrodes 7141 and the protruding electrodes 7171 do not necessarily overlap each other in plan view.

[1.4 Effects and the Like]

As described above, the radio-frequency module 1 according to the present embodiment includes the first base 71, which has at least a part formed of the first semiconductor material and which includes the low-noise amplifier circuit 21, the second base 72, which has at least a part formed of the second semiconductor material having a thermal conductivity lower than that of the first semiconductor material and which includes the power amplifier circuit 11, and the module substrate 90, which has the principal surface 90a on which the first base 71 and the second base 72 are disposed. The first base 71 is joined to the principal surface 90a with the electrodes 717 interposed in between. The second base 72 is disposed between the module substrate 90 and the first base 71 in cross-sectional view, and is joined to the principal surface 90a with the electrode 724 interposed in between. At least a part of the first base 71 overlaps at least a part of the second base 72 in plan view.

According to this configuration, the first base 71, which includes the low-noise amplifier circuit 21, overlaps the second base 72, which includes the power amplifier circuit 11, in plan view, achieving the contribution to a reduction in size of the radio-frequency module 1. Further, the heat generated by the power amplifier circuit 11 included in the second base 72 may be effectively emitted to the outside through the electrodes 717 and the first base 71 which is formed of the first semiconductor material having a thermal conductivity higher than that of the second semiconductor material of which the second base 72 is formed.

In addition, for example, the radio-frequency module 1 according to the present embodiment may include ground electrodes (for example, the protruding electrodes 7171 and/or the via electrodes 7141) disposed between the power amplifier circuit 11 and the low-noise amplifier circuit 21.

According to this configuration, the ground electrodes are disposed between the power amplifier circuit 11 and the low-noise amplifier circuit 21, achieving the suppression of a reduction, which is due to the reduction in size, of the isolation between the power amplifier circuit 11 and the low-noise amplifier circuit 21.

In addition, for example, in the radio-frequency module 1 according to the present embodiment, the power amplifier circuit 11 does not necessarily overlap the low-noise amplifier circuit 21 in plan view. The ground electrodes may be disposed between the power amplifier circuit 11 and the low-noise amplifier circuit 21 in plan view. The radio-frequency module 1 may include at least one of the following electrodes: the via electrodes 7141 disposed in the first base 71; the protruding electrodes 7171 protruding from the first base 71 or the second base 72 toward the principal surface 90a of the module substrate 90.

According to this configuration, when the power amplifier circuit 11 does not overlap the low-noise amplifier circuit 21 in plan view, the via electrodes 7141 and/or the protruding electrodes 7171 may be used to suppress a reduction of the isolation between the power amplifier circuit 11 and the low-noise amplifier circuit 21.

In addition, for example, in the radio-frequency module 1 according to the present embodiment, the ground electrodes are not necessarily joined to the power amplifier circuit 11 and the low-noise amplifier circuit 21 in the first base 71 and the second base 72.

According to this configuration, a reduction of the isolation between the power amplifier circuit 11 and the low-noise amplifier circuit 21 may be suppressed through the ground electrodes.

In addition, for example, in the radio-frequency module 1 according to the present embodiment, the switching circuit 51 connected to the output end of the power amplifier circuit 11 may be formed in the first base 71.

According to this configuration, in addition to the low-noise amplifier circuit 21, the switching circuit 51 is formed in the first base 71, achieving the contribution to a further reduction in size of the radio-frequency module 1.

In addition, for example, in the radio-frequency module 1 according to the present embodiment, at least a part of the power amplifier circuit 11 may overlap at least a part of the switching circuit 51 in plan view.

According to this configuration, the wiring length between the power amplifier circuit 11 and the switching circuit 51 may be decreased, achieving a reduction of the wiring loss and mismatching loss due to the stray capacitance of wiring.

In addition, for example, in the radio-frequency module 1 according to the present embodiment, the switching circuit 52 connected between the input end of the power amplifier circuit 11 and the radio-frequency input terminals 111 and 112 for receiving radio-frequency signals from the outside may be formed in the first base 71.

According to this configuration, in addition to the low-noise amplifier circuit 21, the switching circuit 52 is formed in the first base 71, achieving the contribution to a further reduction in size of the radio-frequency module 1.

In addition, for example, in the radio-frequency module 1 according to the present embodiment, at least a part of the power amplifier circuit 11 may overlap at least a part of the switching circuit 52 in plan view.

According to this configuration, the wiring length between the power amplifier circuit 11 and the switching circuit 52 may be decreased, achieving a reduction of the wiring loss and mismatching loss due to the stray capacitance of wiring.

In addition, for example, in the radio-frequency module 1 according to the present embodiment, the control circuit 80 which controls the power amplifier circuit 11 may be formed in the first base 71.

According to this configuration, in addition to the low-noise amplifier circuit 21, the control circuit 80 is formed in the first base 71, achieving the contribution to a further reduction in size of the radio-frequency module 1.

In addition, for example, in the radio-frequency module 1 according to the present embodiment, at least a part of the power amplifier circuit 11 may overlap at least a part of the control circuit 80 in plan view.

According to this configuration, the wiring length between the power amplifier circuit 11 and the control circuit 80 may be decreased, achieving a reduction in influence of digital noise due to a control signal.

In addition, for example, in the radio-frequency module 1 according to the present embodiment, the impedance matching circuit 41 connected to the output end of the power amplifier circuit 11 may be formed in the first base 71.

According to this configuration, in addition to the low-noise amplifier circuit 21, the impedance matching circuit 41 is formed in the first base 71, achieving the contribution to a further reduction in size of the radio-frequency module 1.

In addition, for example, in the radio-frequency module 1 according to the present embodiment, at least a part of the power amplifier circuit 11 may overlap at least a part of the impedance matching circuit 41 in plan view.

According to this configuration, the wiring length between the power amplifier circuit 11 and the impedance matching circuit 41 may be decreased, achieving a reduction of the wiring loss and mismatching loss due to the stray capacitance of wiring.

In addition, for example, in the radio-frequency module 1 according to the present embodiment, a first electric circuit may include the control circuit 80 which controls the power amplifier circuit 11.

According to this configuration, the control circuit 80 is formed in the first base 71 which overlaps the second base 72 in plan view. Thus, the wiring length between the power amplifier circuit 11, which is included in the second base 72, and the control circuit 80 may be decreased, achieving a reduction in influence of digital noise due to a control signal.

In addition, for example, in the radio-frequency module 1 according to the present embodiment, the first electric circuit may include the switching circuit 51 connected between the output end of the power amplifier circuit 11 and the transmit-filter circuit 61T and/or the transmit-filter circuit 62T.

According to this configuration, the switching circuit 51 connected to the output end of the power amplifier circuit 11 is formed in the first base 71. Thus, the wiring length between the switching circuit 51 and the power amplifier circuit 11 may be decreased, achieving a reduction of the wiring loss and mismatching loss due to the stray capacitance of wiring.

In addition, for example, in the radio-frequency module 1 according to the present embodiment, the first electric circuit may include the switching circuit 52 connected between the input end of the power amplifier circuit 11 and the radio-frequency input terminals 111 and 112 for receiving radio-frequency signals from the outside.

According to this configuration, the switching circuit 52 connected to the input end of the power amplifier circuit 11 is formed in the first base 71. Thus, the wiring length between the switching circuit 52 and the power amplifier circuit 11 may be decreased, achieving a reduction of the wiring loss and mismatching loss due to the stray capacitance of wiring.

In addition, for example, in the radio-frequency module 1 according to the present embodiment, the first semiconductor material may be silicon.

According to this configuration, silicon may be used as the first semiconductor material, enabling the first base 71, having a relatively high thermal conductivity, to be manufactured at a relatively low cost.

In addition, for example, in the radio-frequency module 1 according to the present embodiment, the second semiconductor material may be gallium arsenide.

According to this configuration, gallium arsenide may be used as the second semiconductor material, enabling the power amplifier circuit 11, having a relatively high performance, to be manufactured.

In addition, for example, in the radio-frequency module 1 according to the present embodiment, the power amplifier circuit 11 may include the circuit devices 721, each of which has the collector layer 721C, the base layer 721B, and the emitter layer 721E. The collector layer 721C, the base layer 721B, and the emitter layer 721E may be laminated in this sequence from the first base 71 side.

According to this configuration, wiring, to which each of the collector layer 721C, the base layer 721B, and the emitter layer 721E is connected, may be easily made in a manufacturing process. In addition, the area of the collector layer 721C is larger than the area of each of the base layer 721B and the emitter layer 721E in plan view. Therefore, joining the collector layer 721C to the first base 71 enables the joint area to be increased compared with the case in which the base layer 721B or the emitter layer 721E is joined to the first base 71. As a result, the joint between the first base 71 and the second base 72 is strengthened, achieving the suppression of the state in which the second base 72 peels off from the first base 71.

The radio-frequency module 1 according to the present embodiment includes the first base 71, which has at least a part formed of silicon or gallium nitride and which includes the low-noise amplifier circuit 21, the second base 72, which has at least a part formed of gallium arsenide or silicon germanium and which includes the power amplifier circuit 11, and the module substrate 90, which has the principal surface 90a on which the first base 71 and the second base 72 are disposed. The first base 71 is joined to the principal surface 90a with the electrodes 717 interposed in between. The second base 72 is disposed between the module substrate 90 and the first base 71 in cross-sectional view, and is joined to the principal surface 90a with the electrode 724 interposed in between. At least a part of the first base 71 overlaps at least a part of the second base 72 in plan view.

According to this configuration, the first base 71, in which the low-noise amplifier circuit 21 is included, overlaps the second base 72, in which the power amplifier circuit 11 is included, in plan view, achieving the contribution to a reduction in size of the radio-frequency module 1. Further, the heat generated by the power amplifier circuit 11 included in the second base 72 may be effectively emitted to the outside through the electrodes 717 and the first base 71 which is formed of silicon or gallium nitride having a thermal conductivity higher than that of gallium arsenide or silicon germanium of which the second base 72 is formed.

The communication device 5 according to the present embodiment includes the RFIC 3, which processes radio-frequency signals, and the radio-frequency module 1, which transmits radio-frequency signals between the RFIC 3 and the antenna 2.

According to this configuration, the communication device 5 may have substantially the same effects as those of the radio-frequency module 1.

Second Embodiment

A second embodiment will be described. The present embodiment is mainly different from the first embodiment in that, instead of the duplexer circuits having passbands corresponding to frequency bands for FDD, a radio-frequency module has filter circuits having passbands corresponding to frequency bands for TDD (Time Division Duplex). The radio-frequency module according to the present embodiment will be described below by focusing on points different from those in the first embodiment.

[2.1 The Circuit Configuration of a Radio-Frequency Module 1A]

Figure 7:
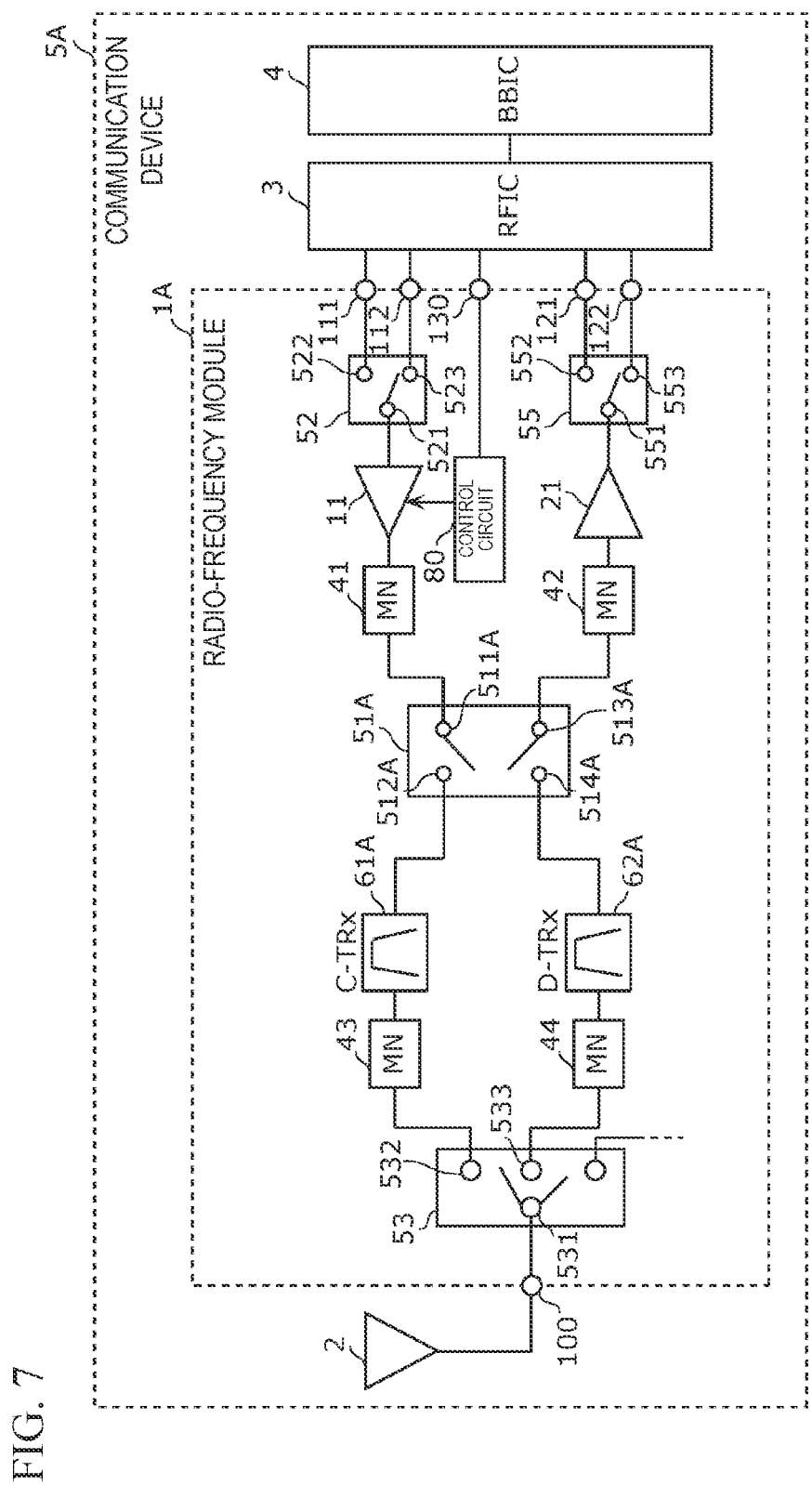
FIG. 7 is a diagram illustrating the circuit configuration of a radio-frequency module and a communication device according to a second embodiment.

A radio-frequency module 1A according to the present embodiment will be described by referring to FIG. 7. FIG. 7 is a diagram illustrating the circuit configuration of the radio-frequency module 1A and a communication device 5A according to the second embodiment. The communication device 5A is substantially the same as the communication device 5 according to the first embodiment, and will not be described.

As illustrated in FIG. 7, the radio-frequency module 1A includes the power amplifier circuit 11, the low-noise amplifier circuit 21, the impedance matching circuits 41 to 44, switching circuits 51A, 52, 53 and 55, filter circuits 61A and 62A, the control circuit 80, the antenna connection terminal 100, the radio-frequency input terminals 111 and 112, the radio-frequency output terminals 121 and 122, and the control terminal 130.

The switching circuit 51A, which is an exemplary third switching circuit, is connected to the output end of the power amplifier circuit 11 and the input end of the low-noise amplifier circuit 21. The switching circuit 51A is connected to the filter circuits 61A and 62A.

The switching circuit 51A includes terminals 511A to 514A. The terminal 511A is connected to the output end of the power amplifier circuit 11 through the impedance matching circuit 41. The terminal 512A is connected to the filter circuit 61A. The terminal 513A is connected to the input end of the low-noise amplifier circuit 21 through the impedance matching circuit 42. The terminal 514A is connected to the filter circuit 62A.

In this connection configuration, the switching circuit 51A is capable of connecting the terminal 512A to any of the terminals 511A and 513A, for example, on the basis of a control signal from the RFIC 3. Further, the switching circuit 51A is capable of connecting the terminal 514A to any of the terminals 511A and 513A. That is, the switching circuit 51A is capable of switching the connection of the filter circuit 61A between the power amplifier circuit 11 and the low-noise amplifier circuit 21. Further, the switching circuit 51A is capable of switching the connection of the filter circuit 62A between the power amplifier circuit 11 and the low-noise amplifier circuit 21. The switching circuit 51A is formed, for example, by using a multi-connection switch, and may be called a TDD switch.

The filter circuit 61A (C-TRx) has a passband including Band C, and is capable of passing radio-frequency signals in Band C. The filter circuit 61A transmits transmit signals and receive signals in Band C by using a TDD system. The filter circuit 61A is connected between the power amplifier circuit 11 and the antenna connection terminal 100 and between the low-noise amplifier circuit 21 and the antenna connection terminal 100. Specifically, the filter circuit 61A is connected, at its first end, to the output end of the power amplifier circuit 11 through the switching circuit 51A and the impedance matching circuit 41, and is connected, at its first end, to the input end of the low-noise amplifier circuit 21 through the switching circuit 51A and the impedance matching circuit 42. In contrast, the filter circuit 61A is connected, at its second end, to the antenna connection terminal 100 through the impedance matching circuit 43 and the switching circuit 53.

The filter circuit 62A (D-TRx) has a passband including Band D, and is capable of passing radio-frequency signals in Band D. The filter circuit 62A transmits transmit signals and receive signals in Band D by using a TDD system. The filter circuit 62A is connected between the power amplifier circuit 11 and the antenna connection terminal 100 and between the low-noise amplifier circuit 21 and the antenna connection terminal 100. Specifically, the filter circuit 62A is connected, at its first end, to the output end of the power amplifier circuit 11 through the switching circuit 51A and the impedance matching circuit 41, and is connected, at its first end, to the input end of the low-noise amplifier circuit 21 through the switching circuit 51A and the impedance matching circuit 42. In contrast, the filter circuit 62A is connected, at its second end, to the antenna connection terminal 100 through the impedance matching circuit 44 and the switching circuit 53.

[2.2 the Configuration of an Integrated Circuit 70A]

Figure 8:
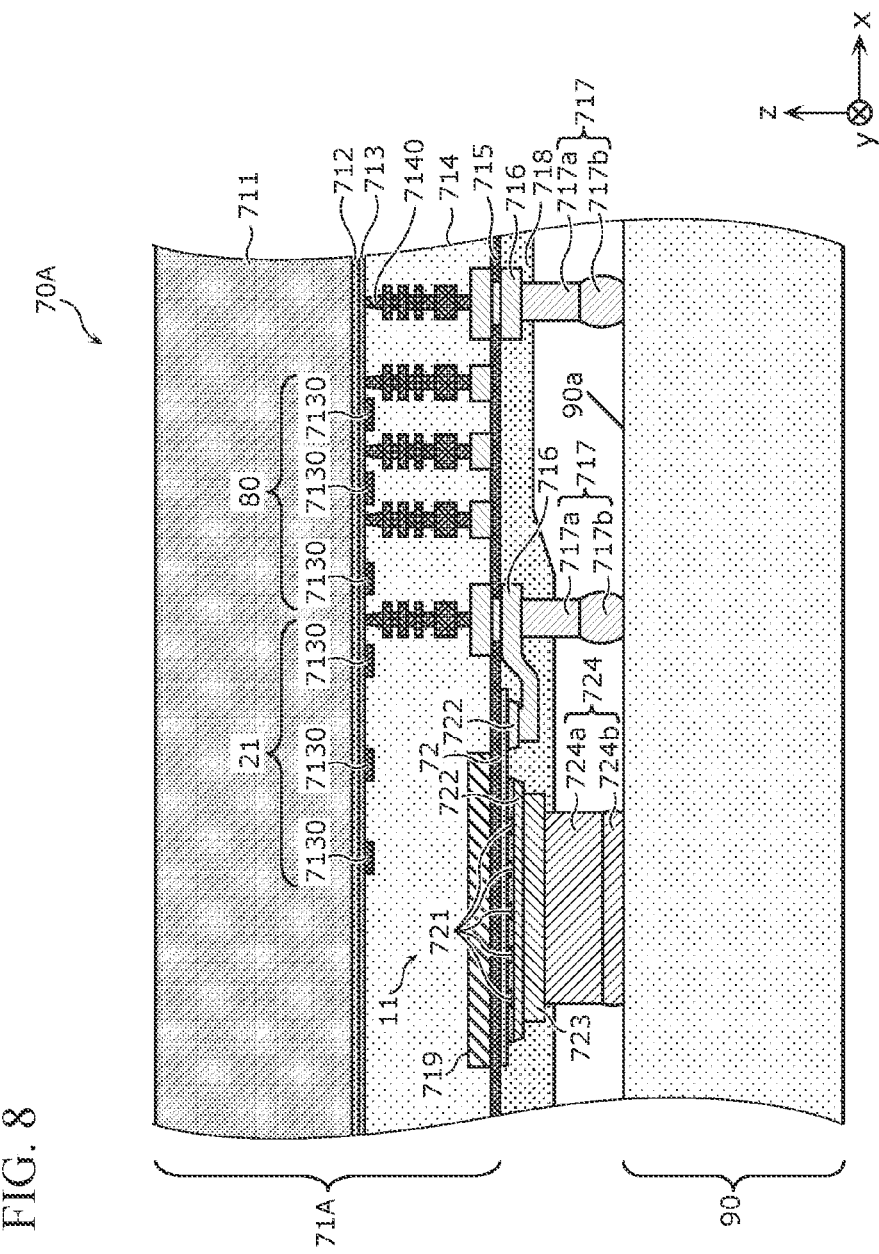
FIG. 8 is a partial cross-sectional view of a radio-frequency module according to the second embodiment.
Figure 9:
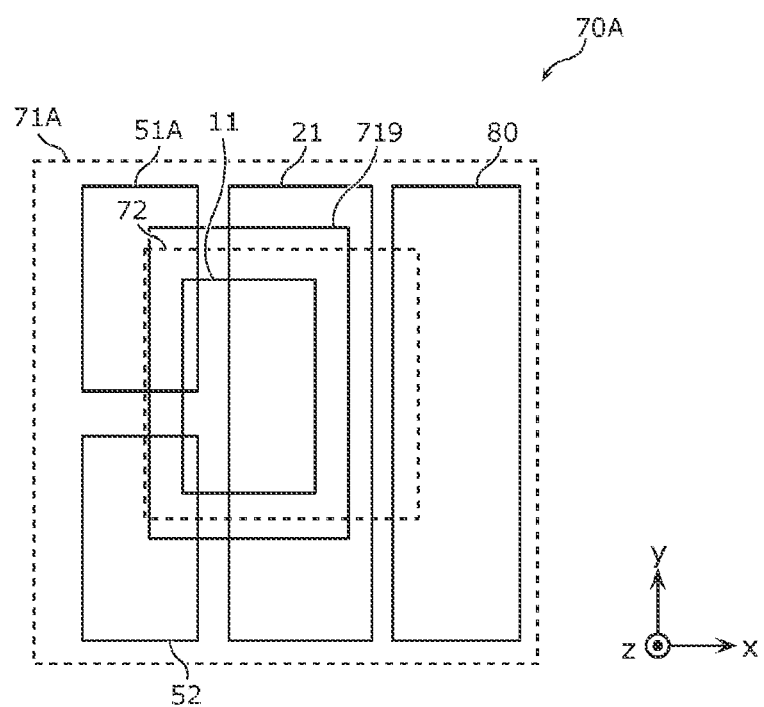
FIG. 9 is a diagram illustrating the circuit layout in an integrated circuit according to the second embodiment.

The configuration of an integrated circuit 70A will be described by referring to FIGS. 8 and 9. FIG. 8 is a partial cross-sectional view of the radio-frequency module 1A according to the second embodiment. FIG. 9 is a diagram illustrating the circuit layout in the integrated circuit 70A according to the first embodiment. Specifically, FIG. 8 is an enlarged cross-sectional view of the integrated circuit 70A, and FIG. 9 is a perspective plan view of the integrated circuit 70A. In FIGS. 8 and 9, not all the wiring and electrodes are illustrated. In FIG. 9, the broken lines indicate the outlines of a first base 71A and the second base 72.

As illustrated in FIG. 8, the integrated circuit 70A includes the first base 71A and the second base 72. At least a part of the first base 71A overlaps at least a part of the second base 72 in plan view.

[2.2.1 The Configuration of the First Base 71A]

The first base 71A according to the present embodiment has a configuration similar to that of the first base 71 according to the first embodiment. However, in the first base 71A, the low-noise amplifier circuit 21 is formed so as to overlap the power amplifier circuit 11 in plan view. The silicon dioxide layer 714 includes a ground layer 719 formed thereon. As illustrated in FIG. 8, the ground layer 719 is disposed between the power amplifier circuit 11 and the low-noise amplifier circuit 21 in cross-sectional view.

The position of the ground layer 719 is not limited to the first base 71A. For example, the ground layer 719 may be interposed between the first base 71A and the second base 72.

[2.2.2 The Circuit Layout of the Integrated Circuit 70A]

The circuit layout in the integrated circuit 70A in plan view will be described by referring to FIG. 9.

As illustrated in FIG. 9, in the present embodiment, a part of the power amplifier circuit 11 formed in the second base 72 overlaps, in plan view, a part of each of the low-noise amplifier circuit 21 and the switching circuits 51A and 52 which are formed in the first base 71A. In contrast, the power amplifier circuit 11 does not overlap, in plan view, the control circuit 80 formed in the first base 71A.

The first base 71A includes the ground layer 719. The ground layer 719 is disposed between the power amplifier circuit 11 and the low-noise amplifier circuit 21 in cross-sectional view. In addition, the ground layer 719 overlaps, at least in part, both the power amplifier circuit 11 and the low-noise amplifier circuit 21 in plan view. The ground layer 719 is not joined to the power amplifier circuit 11 and the low-noise amplifier circuit 21 in the first base 71A and the second base 72.

[2.3 Effects and the Like]

As described above, the radio-frequency module 1A according to the present embodiment includes the first base 71A, which has at least a part formed of the first semiconductor material and which includes the low-noise amplifier circuit 21, the second base 72, which has at least a part formed of the second semiconductor material having a thermal conductivity lower than that of the first semiconductor material and which includes the power amplifier circuit 11, a ground electrode (for example, the ground layer 719), which is disposed between the power amplifier circuit 11 and the low-noise amplifier circuit 21, and the module substrate 90, which has the principal surface 90a on which the first base 71A and the second base 72 are disposed. The first base 71A is joined to the principal surface 90a with the electrodes 717 interposed in between. The second base 72 is disposed between the module substrate 90 and the first base 71A in cross-sectional view, and is joined to the principal surface 90a with the electrode 724 interposed in between. At least a part of the first base 71A overlaps at least a part of the second base 72 in plan view.

According to this configuration, the first base 71A, in which the low-noise amplifier circuit 21 is included, overlaps, in plan view, the second base 72, in which the power amplifier circuit 11 is included, achieving the contribution to a reduction in size of the radio-frequency module 1. At that time, the ground electrode is disposed between the power amplifier circuit 11 and the low-noise amplifier circuit 21, achieving the suppression of a reduction, which is due to the reduction in size, of the isolation between the power amplifier circuit 11 and the low-noise amplifier circuit 21. Further, the heat generated by the power amplifier circuit 11 formed in the second base 72 may be effectively emitted to the outside through the electrodes 717 and the first base 71A which is formed of the first semiconductor material having a thermal conductivity higher than that of the second semiconductor material of which the second base 72 is formed.

In addition, for example, in the radio-frequency module 1A according to the present embodiment, at least a part of the power amplifier circuit 11 may overlap at least a part of the low-noise amplifier circuit 21 in plan view, and the ground electrode may include the ground layer 719 disposed between the power amplifier circuit 11 and the low-noise amplifier circuit 21 in cross-sectional view.

According to this configuration, when the power amplifier circuit 11 overlaps the low-noise amplifier circuit 21 in plan view, the ground layer 719 may be used to suppress a reduction of the isolation between the power amplifier circuit 11 and the low-noise amplifier circuit 21.

In addition, for example, in the radio-frequency module 1A according to the present embodiment, the switching circuit 51A, which is connected to the output end of the power amplifier circuit 11 and the input end of the low-noise amplifier circuit 21, may be formed in the first base 71A.

According to this configuration, in addition to the low-noise amplifier circuit 21, the switching circuit 51A is formed in the first base 71, achieving the contribution to a further reduction in size of the radio-frequency module 1A.

In addition, for example, in the radio-frequency module 1A according to the present embodiment, at least a part of the power amplifier circuit 11 may overlap at least a part of the switching circuit 51A in plan view.

According to this configuration, the wiring length between the power amplifier circuit 11 and the switching circuit 51A may be decreased, and the wiring loss and mismatching loss due to the stray capacitance of wiring may be reduced.

Other Embodiments

A radio-frequency module and a communication device which are provided by the present disclosure are described on the basis of the embodiments. The radio-frequency module and the communication device, which are provided by the present disclosure, are not limited to the embodiments described above. Other embodiments, which are embodied by combining any components in the embodiments, modified examples, which are obtained by making, on the embodiments, various changes conceived by those skilled in the art without departing from the gist of the present disclosure, and various devices, in which the radio-frequency module and the communication device are built in, are also encompassed in the present disclosure.

For example, in the integrated circuit 70 according to the first embodiment, like the integrated circuit 70A according to the second embodiment, the power amplifier circuit 11 may overlap the low-noise amplifier circuit 21 in plan view. On the other hand, in the integrated circuit 70A according to the second embodiment, like the integrated circuit 70 according to the first embodiment, the power amplifier circuit 11 does not necessarily overlap the low-noise amplifier circuit 21 in plan view.

The present disclosure may be widely used as a radio-frequency module, which is disposed in a front-end unit, in communication devices such as a cellular phone.

1, 1A radio-frequency module
2 antenna
3 RFIC
4 BBIC
5, 5A communication device
11 power amplifier circuit
21 low-noise amplifier circuit
41, 42, 43, 44 impedance matching circuit
51, 51A, 52, 53, 54, 55 switching circuit
61, 62 duplexer circuit
61A, 62A filter circuit
61R, 62R receive-filter circuit
61T, 62T transmit-filter circuit
70, 70A integrated circuit
71, 71A first base
72 second base
72a semiconductor layer
72b epitaxial layer
80 control circuit
90 module substrate
90a, 90b principal surface
91 resin member
92 shield electrode layer
100 antenna connection terminal
111, 112 radio-frequency input terminal
121, 122 radio-frequency output terminal
130 control terminal
150 external connection terminal
711 silicon substrate
712, 714 silicon dioxide layer
713 silicon layer
715 silicon nitride layer
716, 717, 722, 723, 724 electrode
7171 protruding electrode
717a, 724a columnar conductor
717b, 724b bump electrode
718 resin layer
719 ground layer
721, 7130 circuit device
721B base layer
721C collector layer
721E emitter layer
7140, 7141 via electrode

The invention claimed is:

1. A radio-frequency module comprising:
a first base including a low-noise amplifier circuit, wherein at least a part of the first base is comprised of a first semiconductor material having a first thermal conductivity;
a second base including a power amplifier circuit, wherein at least a part of the second base is comprised of a second semiconductor material having a second thermal conductivity lower than the first thermal conductivity of the first base; and
a module substrate having a principal surface, wherein the first base and the second base are disposed on the principal surface,
wherein the first base is joined to the principal surface with a first electrode interposed in between,
wherein the second base is disposed between the module substrate and the first base in cross-sectional view, and is joined to the principal surface with a second electrode interposed in between, and
wherein at least a part of the first base overlaps at least a part of the second base in plan view.

2. The radio-frequency module according to claim 1, further comprising
a ground electrode disposed between the power amplifier circuit and the low-noise amplifier circuit.

3. The radio-frequency module according to claim 2,
wherein the power amplifier circuit does not overlap the low-noise amplifier circuit in plan view, and
wherein the ground electrode is disposed between the power amplifier circuit and the low-noise amplifier circuit in plan view, and includes at least one of a via electrode and a protruding electrode, the via electrode being disposed in the first base, the protruding electrode protruding from the first base or the second base toward the principal surface of the module substrate.

4. The radio-frequency module according to claim 2,
wherein at least a part of the power amplifier circuit overlaps at least a part of the low-noise amplifier circuit in plan view, and
wherein the ground electrode includes a ground layer disposed between the power amplifier circuit and the low-noise amplifier circuit in cross-sectional view.

5. The radio-frequency module according to claim 2, wherein the ground electrode is not joined to the power amplifier circuit and the low-noise amplifier circuit in the first base and the second base.

6. The radio-frequency module according to claim 1, wherein a first switching circuit connected to an output end of the power amplifier circuit is provided in the first base.

7. The radio-frequency module according to claim 6, wherein at least a part of the power amplifier circuit overlaps at least a part of the first switching circuit in plan view.

8. The radio-frequency module according to claim 1, wherein a second switching circuit connected between an input end of the power amplifier circuit and an input terminal is provided in the first base, the input terminal being for receiving a radio-frequency signal from outside.

9. The radio-frequency module according to claim 8, wherein at least a part of the power amplifier circuit overlaps at least a part of the second switching circuit in plan view.

10. The radio-frequency module according to claim 1, wherein a third switching circuit connected to an output end of the power amplifier circuit and an input end of the low-noise amplifier circuit is provided in the first base.

11. The radio-frequency module according to claim 10, wherein at least a part of the power amplifier circuit overlaps at least a part of the third switching circuit in plan view.

12. The radio-frequency module according to claim 1, wherein a control circuit configured to control the power amplifier circuit is provided in the first base.

13. The radio-frequency module according to claim 12, wherein at least a part of the power amplifier circuit overlaps at least a part of the control circuit in plan view.

14. The radio-frequency module according to claim 1, wherein an impedance matching circuit connected to an output end of the power amplifier circuit is provided in the first base.

15. The radio-frequency module according to claim 14, wherein at least a part of the power amplifier circuit overlaps at least a part of the impedance matching circuit in plan view.

16. The radio-frequency module according to claim 1, wherein the first semiconductor material is silicon.

17. The radio-frequency module according to claim 1, wherein the second semiconductor material is gallium arsenide.

18. The radio-frequency module according to claim 1, wherein the power amplifier circuit includes a circuit device having a collector layer, a base layer, and an emitter layer, and
wherein the collector layer, the base layer, and the emitter layer are laminated in this sequence.

19. A radio-frequency module comprising:
a first base including a low-noise amplifier circuit, wherein at least a part of the first base is comprised of silicon or gallium nitride;
a second base including a power amplifier circuit, wherein at least a part of the second base is comprised of gallium arsenide or silicon germanium; and
a module substrate having a principal surface, wherein the first base and the second base are disposed on the principal surface,
wherein the first base is joined to the principal surface with a first electrode interposed in between,
wherein the second base is disposed between the module substrate and the first base in cross-sectional view, and is joined to the principal surface with a second electrode interposed in between, and
wherein at least a part of the first base overlaps at least a part of the second base in plan view.

20. A communication device comprising:
a signal processing circuit configured to process a radio-frequency signal; and
the radio-frequency module, according to claim 1, configured to transmit the radio-frequency signal between the signal processing circuit and an antenna.

* * * * *